(12) United States Patent
Ito et al.

(10) Patent No.: US 9,982,831 B2
(45) Date of Patent: May 29, 2018

(54) THERMAL INSULATION AND METHOD OF PRODUCING THE SAME

(71) Applicant: NICHIAS CORPORATION, Tokyo (JP)

(72) Inventors: Yasuo Ito, Hamamatsu (JP); Yoshihiko Goto, Yokohama (JP); Isami Abe, Hamamatsu (JP); Shigeru Nakama, Hamamatsu (JP); Takahiro Ohmura, Hamamatsu (JP)

(73) Assignee: NICHIAS CORPORATION, Tokyo (JP)

( * ) Notice: Subject to any disclaimer, the term of this patent is extended or adjusted under 35 U.S.C. 154(b) by 0 days. days.

(21) Appl. No.: 15/192,194

(22) Filed: Jun. 24, 2016

(65) Prior Publication Data

US 2016/0305597 A1 Oct. 20, 2016

Related U.S. Application Data

(62) Division of application No. 12/903,531, filed on Oct. 13, 2010, now abandoned.

(30) Foreign Application Priority Data

Oct. 16, 2009 (JP) ................... 2009-239326

(51) Int. Cl.
*F16L 59/02* (2006.01)
*C04B 30/02* (2006.01)
(Continued)

(52) U.S. Cl.
CPC ............ *F16L 59/028* (2013.01); *C04B 30/02* (2013.01); *E04B 1/80* (2013.01); *C04B 2201/20* (2013.01);
(Continued)

(58) Field of Classification Search
CPC ....... C04B 30/02; C04B 14/062; C04B 14/42; C04B 22/062; C04B 22/064;
(Continued)

(56) References Cited

U.S. PATENT DOCUMENTS 2,754,547 A * 7/1956 Allen ...................... C04B 28/18
106/704
4,174,331 A 11/1979 Myles
(Continued)

FOREIGN PATENT DOCUMENTS

CA 2231428 A1 3/1997
CN 1594197 A 3/2005
(Continued)

OTHER PUBLICATIONS

Mar. 24, 2016 Office Action issued in U.S. Appl. No. 12/903,531.
(Continued)

*Primary Examiner* — Shuangyi Abu Ali
(74) *Attorney, Agent, or Firm* — Oliff PLC

(57) ABSTRACT

Provided is a thermal insulation having both excellent thermal insulating performance and excellent strength, and a method of producing the same. A method of producing a thermal insulation according to the present invention includes curing (S2) a dry-pressed compact, including silica fine particles each having an average particle diameter of 50 nm or less and a reinforcement fiber, at a relative humidity of 70% or more.

17 Claims, 13 Drawing Sheets

(51) Int. Cl.
  *E04B 1/80* (2006.01)
  *E04B 1/74* (2006.01)
(52) U.S. Cl.
  CPC ...... *C04B 2201/32* (2013.01); *C04B 2201/50* (2013.01); *E04B 2001/742* (2013.01)
(58) Field of Classification Search
  CPC ............ C04B 40/0259; C04B 2201/20; C04B 2201/32; C04B 2201/50; E04B 1/80; E04B 2001/742
  See application file for complete search history.

(56) References Cited

U.S. PATENT DOCUMENTS

| | | | |
|---|---|---|---|
| 4,221,578 | A | 9/1980 | Shoup et al. |
| 4,564,547 | A | 1/1986 | Hughes |
| 4,636,416 | A | 1/1987 | Kratel et al. |
| 5,599,759 | A | 2/1997 | Inagaki et al. |
| 6,099,749 | A | 8/2000 | Boes et al. |
| 6,143,400 | A | 11/2000 | Schwertfeger et al. |
| 6,887,563 | B2 | 5/2005 | Frank et al. |
| 2001/0003358 | A1 | 6/2001 | Terase et al. |
| 2003/0080313 | A1 | 5/2003 | Eyhorn et al. |

FOREIGN PATENT DOCUMENTS

| | | |
|---|---|---|
| GB | 2256192 A | 12/1992 |
| JP | H01-145497 A | 6/1989 |
| JP | H11-513349 A | 11/1999 |
| JP | H11-514959 A | 12/1999 |
| JP | 2007-197264 A | 8/2007 |
| JP | 2008164078 A | 7/2008 |

OTHER PUBLICATIONS

Aug. 12, 2015 Office Action issued in Korean Application No. 10-2010-0100974.
Jun. 25, 2013 Office Action issued in Japanese Application No. 2009-239326.
Feb. 8, 2013 Office Action issued in Chinese Application No. 201010511714.0.
Oct. 16, 2014 Office Action issued in U.S. Appl. No. 12/903,531.
May 22, 2014 Office Action issued in U.S. Appl. No. 12/903,531.
Oct. 10, 2012 Office Action issued in U.S. Appl. No. 12/903,531.
Apr. 27, 2016 Office Action issued in U.S. Appl. No. 12/903,531.

\* cited by examiner

FIG.3

| | CURING CONDITIONS | 80°C 90RH% | | | | | | | | | A/C (170°C) |
|---|---|---|---|---|---|---|---|---|---|---|---|
| | CURING TIME | 0hr | 3hr | 6hr | 12hr | 24hr | 48hr | 100hr | 250hr | 400hr | 6hr |
| Ca(OH)₂ ADDITION AMOUNT | 0 PART BY WEIGHT | 0.25 MPa | 0.40 MPa | 0.42 MPa | 0.52 MPa | 0.56 MPa | 0.68 MPa | 0.92 MPa | 1.01 MPa | 1.08 MPa | 0.97 MPa |
| | 1 PART BY WEIGHT | | 0.83 MPa | 0.75 MPa | 0.85 MPa | 1.11 MPa | 1.13 MPa | — | — | — | 0.53 MPa |
| | 3 PARTS BY WEIGHT | | 0.89 MPa | 1.03 MPa | 0.95 MPa | 0.98 MPa | 0.82 MPa | — | — | — | 0.29 MPa |
| | 5 PARTS BY WEIGHT | | 0.91 MPa | 1.08 MPa | 1.00 MPa | 0.96 MPa | 0.90 MPa | — | — | — | 0.27 MPa |
| | 10 PARTS BY WEIGHT | | 0.93 MPa | 0.91 MPa | 0.91 MPa | 0.78 MPa | 0.68 MPa | 0.82 MPa | 0.80 MPa | — | 0.30 MPa |

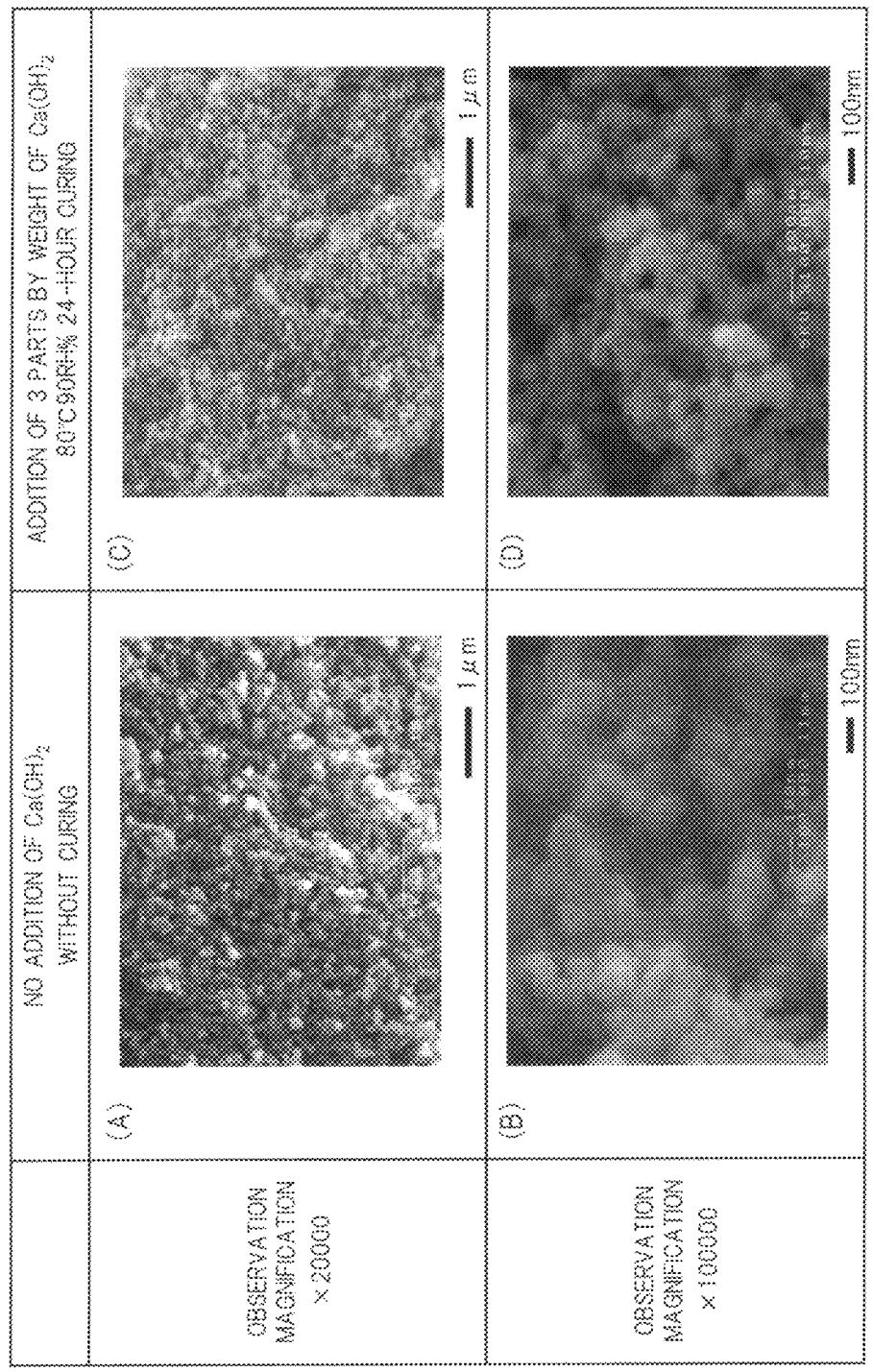

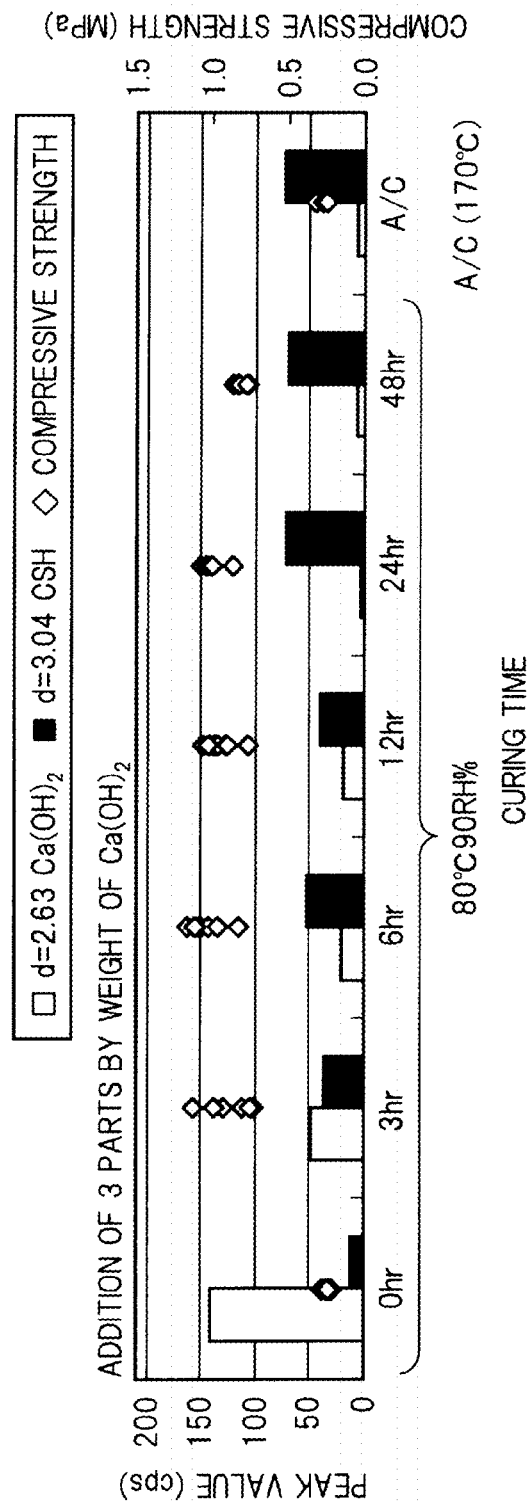

FIG.7

| ADDITION AMOUNT OF Ca(OH)$_2$ | BULK DENSITY (kg/m$^3$) | COMPRESSIVE STRENGTH (MPa) | THERMAL CONDUCTIVITY (W/(m·K)) | | |
|---|---|---|---|---|---|
| | | | 200°C | 400°C | 600°C |
| 0 PART BY WEIGHT (WITHOUT CURING) | 240 | 0.29 | 0.025 | 0.027 | 0.034 |
| | 260 | 0.37 | | | |
| | 280 | 0.45 | | | |
| | 300 | 0.55 | | | |
| 3 PARTS BY WEIGHT (8-HOUR CURING) | 240 | 0.67 | 0.034 | 0.035 | 0.039 |
| | 260 | 0.84 | | | |
| | 280 | 1.05 | | | |
| | 300 | 1.28 | | | |
| 5 PARTS BY WEIGHT (8-HOUR CURING) | 240 | 0.50 | 0.029 | 0.029 | 0.036 |
| | 260 | 0.65 | | | |
| | 280 | 0.80 | | | |
| | 300 | 0.99 | | | |
| 10 PARTS BY WEIGHT (8-HOUR CURING) | 240 | 0.35 | 0.027 | 0.028 | 0.035 |
| | 260 | 0.48 | | | |
| | 280 | 0.62 | | | |
| | 300 | 0.80 | | | |

FIG.8

| CURING TIME (hr) | BULK DENSITY (kg/m³) | COMPRESSIVE STRENGTH (MPa) |
|---|---|---|
| 0 (NO ADDITION) | 240 | 0.29 |
| | 260 | 0.37 |
| | 280 | 0.45 |
| | 300 | 0.55 |
| 0 (ADDITION OF 3 PARTS BY WEIGHT) | 240 | 0.19 |
| | 260 | 0.20 |
| | 280 | 0.25 |
| | 300 | 0.30 |
| 1 (ADDITION OF 3 PARTS BY WEIGHT) | 240 | 0.45 |
| | 260 | 0.58 |
| | 280 | 0.72 |
| | 300 | 0.90 |
| 2 (ADDITION OF 3 PARTS BY WEIGHT) | 240 | 0.60 |
| | 260 | 0.73 |
| | 280 | 0.88 |
| | 300 | 1.03 |
| 4 (ADDITION OF 3 PARTS BY WEIGHT) | 240 | 0.64 |
| | 260 | 0.77 |
| | 280 | 0.92 |
| | 300 | 1.09 |
| 8 (ADDITION OF 3 PARTS BY WEIGHT) | 240 | 0.67 |
| | 260 | 0.84 |
| | 280 | 1.05 |
| | 300 | 1.28 |
| 24 (ADDITION OF 3 PARTS BY WEIGHT) | 240 | 0.66 |
| | 260 | 0.80 |
| | 280 | 0.98 |
| | 300 | 1.21 |

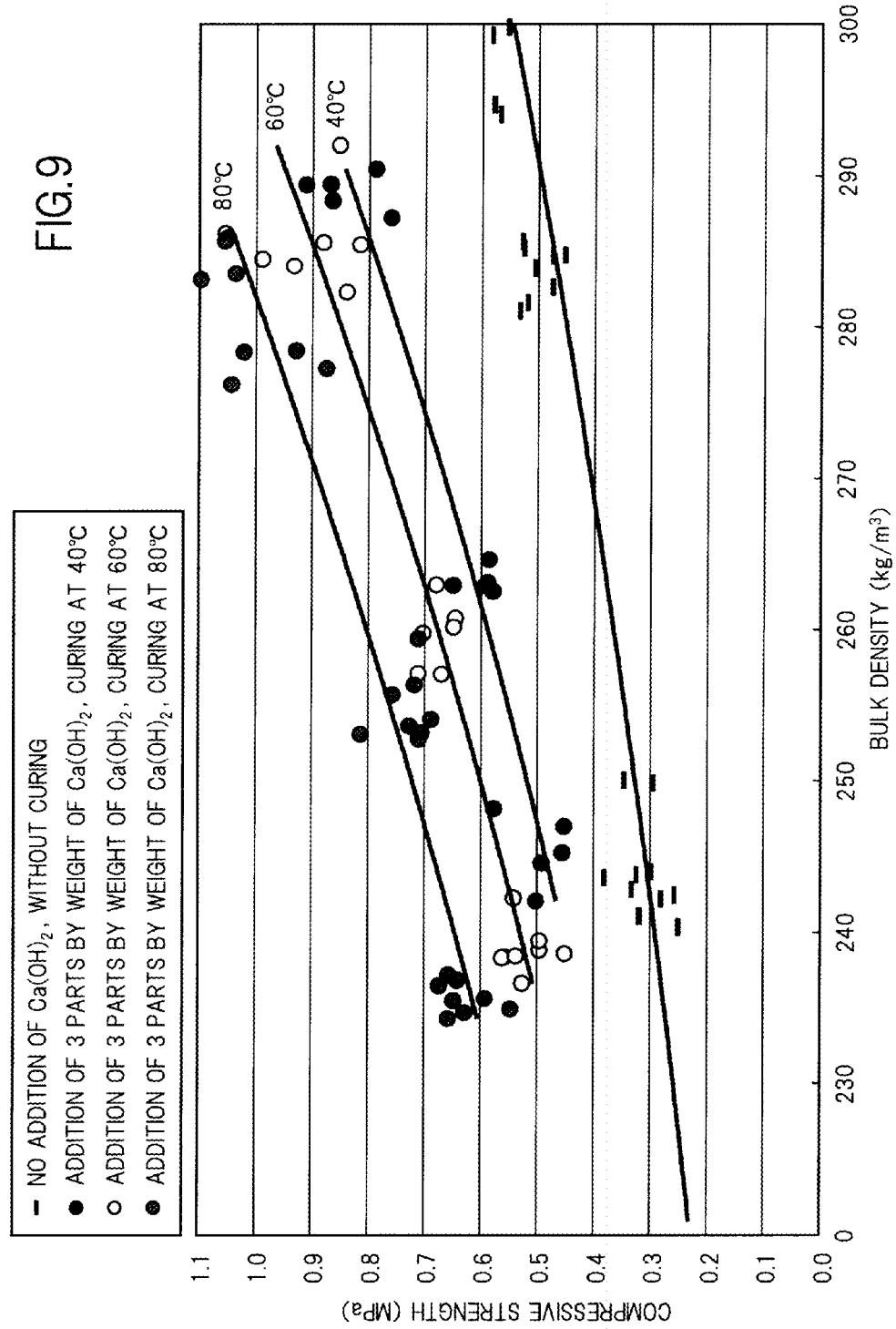

ADDITION OF 3 PARTS BY WEIGHT OF Ca(OH)$_2$, CURED

NO ADDITION OF Ca(OH)$_2$, CURED

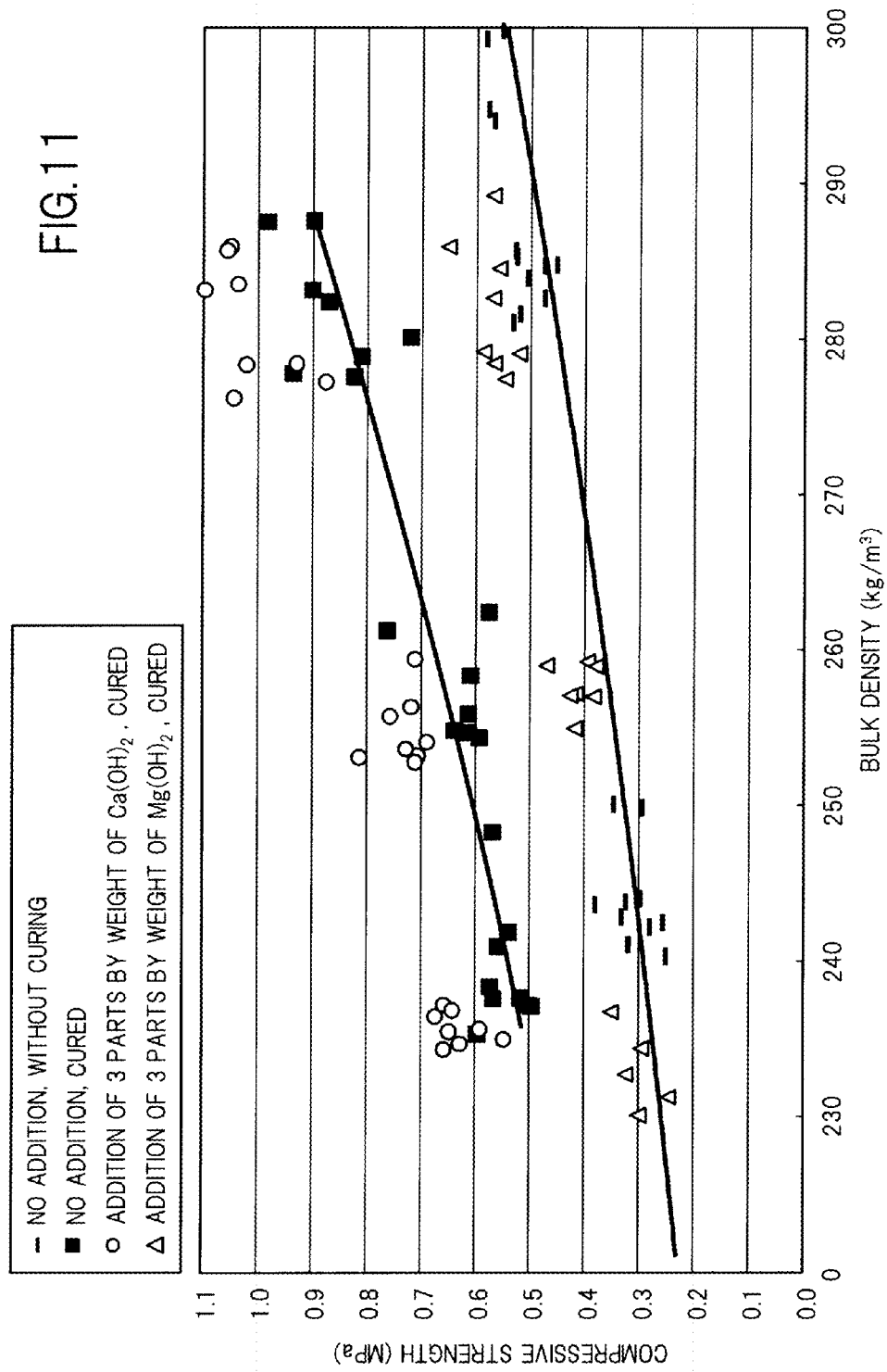

THERMAL INSULATION AND METHOD OF PRODUCING THE SAME

CROSS-REFERENCE TO RELATED APPLICATION

The present application is a divisional application of U.S. patent application Ser. No. 12/903,531, filed on Oct. 13, 2010, which claims priority from Japanese patent application JP 2009-239326, filed on Oct. 16, 2009, the entire contents of which are hereby incorporated by reference into this application.

BACKGROUND OF THE INVENTION

1. Field of the Invention

The present invention relates to a thermal insulation and a method of producing the same, and more particularly, to an improvement in the strength of a thermal insulation.

2. Description of the Related Art

Conventionally, as thermal insulations having low thermal conductivity and being excellent in thermal insulating performance, there have been known ones which are obtained by mixing silica fine particles as a material having a low thermal conductivity, an inorganic fiber, and a binder, and then subjecting the mixture to press forming, followed by machining (for example, JP 11-513349 A and JP 11-514959 A).

However, the above-mentioned conventional technologies have involved a problem in that use of the binder requires, for example, removal of oil, which causes reduction in the strength of the thermal insulations. In addition, the use of the binder increases environmental impact. As described above, there has been a problem in that the removal of oil or the like involves increases in the number of steps and required time and energy when the binder is used.

In contrast, it is also possible to enhance the strength of a thermal insulation by increasing the density of the thermal insulation through the adjustment of pressing pressure without use of a binder. However, this case has involved a problem, for example, in that the thermal insulating performance of the thermal insulation lowers because the increase in the density of the thermal insulation involves an increase in the solid heat transfer.

SUMMARY OF THE INVENTION

The present invention has been made in view of the above-mentioned problems. An object of the present invention is to provide a thermal insulation having both excellent thermal insulating performance and excellent strength, and a method of producing the same.

A method of producing a thermal insulation according to one embodiment of the present invention for solving the above-mentioned problems includes curing a dry-pressed compact including silica fine particles each having an average particle diameter of 50 nm or less and a reinforcement fiber at a relative humidity of 70% or more. According to the present invention, there can be provided a method of producing a thermal insulation having both excellent thermal insulating performance and excellent strength.

Further, the dry-pressed compact may be free of a binder. Further, the dry-pressed compact may include 50 to 98 mass % of the silica fine particles and 2 to 20 mass % of the reinforcement fiber.

Further, the dry-pressed compact may include at least one of an alkaline-earth metal hydroxide and an alkali metal hydroxide. In this case, the dry-pressed compact may include at least one of the alkaline-earth metal hydroxide and the alkali metal hydroxide each at 0.1 to 10 parts by weight with respect to 100 parts by weight of a raw material for the thermal insulation including the silica fine particles and the reinforcement fiber.

A thermal insulation according to one embodiment of the present invention for solving the above-mentioned problems is produced by any one of the methods described above. According to the present invention, there can be provided a thermal insulation having both excellent thermal insulating performance and excellent strength.

A thermal insulation according to one embodiment of the present invention for solving the above-mentioned problems includes silica fine particles each having an average particle diameter of 50 nm or less and a reinforcement fiber, in which the thermal insulation has a bulk density of 190 to 600 kg/m³ and has a compressive strength of 0.65 MPa or more. According to the present invention, there can be provided a thermal insulation having both excellent thermal insulating performance and excellent strength.

Further, the thermal insulation may be free of a binder. Further, the thermal insulation may include 50 to 98 mass % of the silica fine particles and 2 to 20 mass % of the reinforcement fiber.

Further, the thermal insulation may include at least one of an alkaline-earth metal and an alkali metal in addition to the silica fine particles and the reinforcement fiber. In this case, the thermal insulation may include at least one of the alkaline-earth metal and the alkali metal each at 0.1 to 10 parts by weight with respect to 100 parts by weight of a raw material for a thermal insulation including the silica fine particles and the reinforcement fiber. Further, the thermal insulation may have a thermal conductivity of 0.05 W/(m·K) or less at 600° C.

According to the present invention, there can be provided the thermal insulations each having both excellent thermal insulating performance and excellent strength, and the methods of producing a thermal insulation.

BRIEF DESCRIPTION OF THE DRAWINGS

In the accompanying drawings:

FIG. 3 shows one example of results obtained by investigating the compressive strength of thermal insulations by changing curing conditions in an example according to one embodiment of the present invention;

FIG. 4 is an explanatory diagram showing examples of electron microscope photographs of thermal insulations obtained in the example according to one embodiment of the present invention;

FIG. 6A is an explanatory diagram illustrating one example of a correlation of peak values in an X-ray diffraction and a compressive strength with respect to a thermal insulation obtained in the example according to one embodiment of the present invention;

FIG. 7 shows one example of results obtained by investigating the compressive strength of thermal insulations by changing an addition amount of calcium hydroxide in an example according to one embodiment of the present invention;

FIG. 8 shows one example of results obtained by investigating the compressive strength of thermal insulations by changing curing time in an example according to one embodiment of the present invention;

FIG. 9 is an explanatory diagram illustrating one example of results obtained by investigating the compressive strength of a thermal insulation by changing curing temperature in an example according to one embodiment of the present invention;

FIG. 11 is an explanatory diagram illustrating one example of results obtained by investigating the compressive strength of thermal insulations by changing the kind of an alkaline-earth metal hydroxide in an example according to one embodiment of the present invention.

DETAILED DESCRIPTION OF THE INVENTION

Hereinafter, one embodiment of the present invention is described. Note that the present invention is not limited to this embodiment.

First, a method of producing a thermal insulation according to this embodiment (hereinafter referred to as "method of this embodiment") is described. The method of this embodiment is a method of producing a thermal insulation involving curing a dry-pressed compact, including silica fine particles each having an average particle diameter of 50 nm or less and a reinforcement fiber, at a relative humidity of 70% or more.

Figure 1:
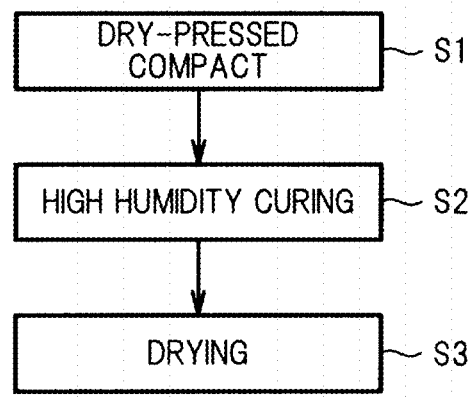
FIG. 1 is an explanatory diagram illustrating main steps included in one example of a method of producing a thermal insulation according to one embodiment of the present invention.

FIG. 1 is an explanatory diagram illustrating main steps included in one example of the method of this embodiment. In the example illustrated in FIG. 1, the method of this embodiment includes a preparation step S1 of preparing the dry-pressed compact, a curing step S2 of curing the dry-pressed compact at high humidity, and a drying step S3 of drying the dry-pressed compact after the curing.

In the preparation step S1, a raw material for a thermal insulation including silica fine particles and a reinforcement fiber is prepared. The silica fine particles are not particularly limited as long as each the silica fine particles have an average particle diameter of 50 nm or less. Any one kind of silica fine particles may be used alone or two or more kinds of silica fine particles may be used in optional combination.

That is, it is possible to use, as the silica fine particles, for example, dry silica fine particles (anhydrous silica fine particles) produced by a gas phase method or wet silica fine particles produced by a wet method. In particular, the dry silica fine particles can be preferably used. To be specific, it is possible to preferably use, for example, fumed silica fine particles produced by the gas phase method. In particular, hydrophilic fumed silica fine particles can be preferably used.

The average particle diameter of the silica fine particles can be set more specifically to, for example, 5 nm or more and 50 nm or less. The silica ($SiO_2$) content of the silica fine particles is preferably, for example, 95 wt % or more. The thermal conductivity at 25° C. of the silica fine particles is preferably, for example, 0.01 W/(m·K) or less. The specific surface area of the silica fine particles by a BET method is preferably, for example, 50 $m^2/g$ or more. To be more specific, the specific surface area can be set to, for example, 50 $m^2/g$ or more and 400 $m^2/g$ or less, or can be set more preferably to 100 $m^2/g$ or more and 300 $m^2/g$ or less.

The reinforcement fiber is not particularly limited as long as the reinforcement fiber can reinforce the thermal insulation. An inorganic fiber or an organic fiber may be used or both of them may be used.

The inorganic fiber is not particularly limited as long as the inorganic fiber can be used as the reinforcement fiber. Any one kind of inorganic fiber may be used alone, or two or more kinds of inorganic fibers may be used in optional combination. To be specific, it is possible to use at least one kind of inorganic fiber selected from the group consisting of, for example, a silica-alumina fiber, a silica fiber, an alumina fiber, a zirconia fiber, an alkaline-earth silicate fiber, a glass fiber, rock wool, and a basalt fiber. Note that the alkaline-earth silicate fiber is a bio-soluble inorganic fiber. That is, a non-bio-soluble inorganic fiber or a bio-soluble inorganic fiber may be used, or both of them may be used, as the inorganic fiber.

The thermal conductivity of the inorganic fiber at 400° C. is, for example, preferably 0.08 W/(m·K) or less or more preferably 0.04 W/(m·K) or less. It is possible to preferably use, for example, a silica-based fiber such as a silica-alumina fiber or a silica fiber as the inorganic fiber with low thermal conductivity described above.

The fiber length of the inorganic fiber is, for example, preferably 1 mm or more and 10 mm or less, more preferably 1 mm or more and 7 mm or less, or particularly preferably 3 mm or more and 5 mm or less. When the fiber length is less than 1 mm, it may be impossible to suitably align the inorganic fiber. As a result, the mechanical strength of the thermal insulation may be insufficient. When the fiber length is more than 10 mm, the powder flow property of the raw material for a thermal insulation at the time of forming may be impaired, a reduction in the formability may occur and density irregularity may cause reduction in the workability.

The average fiber diameter of the inorganic fiber is preferably, for example, 15 µm or less. To be more specific, the average fiber diameter is preferably, for example, 5 µm or more and 15 µm or less. When the average fiber diameter is more than 15 µm, the inorganic fiber may become liable to break in some cases. As a result, the strength of the thermal insulation may be insufficient. Thus, it is possible to preferably use an inorganic fiber having a fiber length of 1 mm or more and 10 mm or less, and having an average fiber diameter of 15 µm or less, as the inorganic fiber.

The organic fiber is not particularly limited as long as the organic fiber can be used as the reinforcement fiber. Any one kind of organic fiber may be used alone, or two or more kinds of organic fibers may be used in optional combination. To be specific, it is possible to use at least one kind of organic fiber selected from the group consisting of, for example, an aramid fiber, a polyethylene fiber, a polypropylene fiber, and a polyolefin fiber.

The fiber length of the organic fiber is, for example, preferably 1 mm or more and 10 mm or less, more preferably 2 mm or more and 7 mm or less, or particularly preferably 3 mm or more and 5 mm or less. When the fiber length is less than 1 mm, it may be impossible to suitably align the organic fibers. As a result, the mechanical strength of the thermal insulation may be insufficient. When the fiber length is more than 10 mm, the powder flow property of the raw material for a thermal insulation at the time of forming may be impaired, a reduction in the formability may occur and density irregularity may cause reduction in the workability.

The average fiber diameter of the organic fiber is preferably, for example, 15 µm or less. To be more specific, the average fiber diameter is preferably, for example, 5 µm or more and 15 µm or less. When the average fiber diameter is more than 15 µm, the organic fiber may become liable to break in some cases. As a result, the strength of the thermal insulation may be insufficient. Thus, it is possible to preferably use an organic fiber having a fiber length of 1 mm or more and 10 mm or less and having an average fiber diameter of 15 µm or less as the organic fiber.

The dry-pressed compact can be produced by mixing such silica fine particles and reinforcement fiber as described above in a dry manner to produce a dry mixture and then subjecting the dry mixture to dry-press forming.

To be specific, the dry-pressed compact is produced, for example, by subjecting a raw material for a thermal insulation including a dry powder of the silica fine particles and a dry powder of the reinforcement fiber to dry mixing by using a predetermined mixing apparatus, and then filling a predetermined forming mold with the resultant dry mixture to carry out dry-press forming. Note that mixing and forming in a dry system facilitate the control of the raw material and compact, and can effectively reduce a time required for production, compared with mixing and forming in a wet system.

The dry-pressed compact may include, for example, 50 to 98 mass % of the silica fine particles and 2 to 20 mass % of the reinforcement fiber, or 65 to 80 mass % of the silica fine particles and 5 to 18 mass % of the reinforcement fiber. When the content of the reinforcement fiber is less than 2 mass %, the strength of the thermal insulation may be insufficient. When the content of the reinforcement fiber is more than 20 mass %, the powder flow property of the raw material for a thermal insulation at the time of forming may be impaired. As a result, reduction in the formability may occur and the density irregularity may cause reduction in the workability.

Further, when the dry-pressed compact includes only the silica fine particles and the reinforcement fiber, the dry-pressed compact, for example, may include 80 to 98 mass % of the silica fine particles and 2 to 20 mass % of the reinforcement fiber so that the total content thereof reaches 100 mass %, may include preferably 82 to 98 mass % of the silica fine particles and 2 to 18 mass % of the reinforcement fiber so that the total content thereof reaches 100 mass %, or may include more preferably 85 to 97 mass % of the silica fine particles and 3 to 15 mass % of the reinforcement fiber so that the total content thereof reaches 100 mass %. When the content of the reinforcement fiber is less than 2 mass %, the strength of the thermal insulation may be insufficient. When the content of the reinforcement fiber is more than 20 mass %, the powder flow property of the raw material for a thermal insulation at the time of forming may be impaired. As a result, reduction in the formability may occur and density irregularity may cause reduction in the workability.

Further, the dry-pressed compact may be free of a binder. That is, in the method of this embodiment, the strength of the thermal insulation can be effectively improved by a curing treatment described later, and hence it is not necessary to use a binder. In this case, the dry-pressed compact is substantially free of a binder that has been conventionally used, such as an inorganic binder, for example, a water glass adhesive, or an organic binder such as a resin. Thus, conventional problems involved in the use of binders can be certainly avoided. Further, in this case, dry-press forming is not particularly limited, and can be carried out, for example, at a temperature of 5° C. or more and 60° C. or less.

Further, the dry-pressed compact may also include at least one of an alkaline-earth metal hydroxide and an alkali metal hydroxide. The alkaline-earth metal hydroxide is not particularly limited as long as the alkaline-earth metal hydroxide can be used as a strong base. Any one kind of alkaline-earth metal hydroxide may be used alone, or two or more kinds of alkaline-earth metal hydroxides may be used in optional combination. To be specific, it is possible to use at least one kind of alkaline-earth metal hydroxide selected from the group consisting of, for example, calcium hydroxide, magnesium hydroxide, strontium hydroxide, and barium hydroxide. In particular, calcium hydroxide can be preferably used.

The alkali metal hydroxide is not particularly limited as long as the alkali metal hydroxide can be used as a strong base. Any one kind of alkali metal hydroxide may be used alone, or two or more kinds of alkali metal hydroxides may be used in optional combination. To be specific, it is possible to use at least one kind of alkali metal hydroxide selected from the group consisting of, for example, sodium hydroxide, potassium hydroxide, and lithium hydroxide.

The dry-pressed compact may include, for example, at least one of the alkaline-earth metal hydroxide and the alkali metal hydroxide each at 0.1 to 10 parts by weight with respect to 100 parts by weight of the raw material for a thermal insulation including the silica fine particles and the reinforcement fiber. That is, in this case, the dry-pressed compact may include one of the alkaline-earth metal hydroxide and the alkali metal hydroxide at 0.1 to 10 parts by weight, or may include the alkaline-earth metal hydroxide and the alkali metal hydroxide at 0.2 to 20 parts by weight in total. The content of at least one of the alkaline-earth metal hydroxide and the alkali metal hydroxide may be set, for example, to 1 to 7 parts by weight or even to 2 to 5 parts by weight.

The dry-pressed compact can be produced by subjecting a dry powder of the silica fine particles, a dry powder of the reinforcement fiber, and a dry powder of at least one of the alkaline-earth metal hydroxide and the alkali metal hydroxide to dry mixing, and then subjecting the resultant dry mixture to dry-press forming.

The dry-pressed compact may also further include other components. That is, the dry-pressed compact may also include, for example, a thermal radiation scattering material. The thermal radiation scattering material is not particularly limited as long as the thermal radiation scattering material can reduce heat transfer caused by thermal radiation. Any one kind of thermal radiation scattering material may be used alone or two or more kinds of thermal radiation scattering materials may be used in optional combination.

To be specific, it is possible to use at least one kind of thermal radiation scattering material selected from the group consisting of silicon carbide, zirconia, and titania. Further, the thermal radiation scattering material preferably has an average particle diameter of, for example, 50 µm or less, or to be more specific, 1 to 50 µm, and has a specific refractive index of, for example, 1.25 or more with respect to the light having a wavelength of 1 µm or more.

When the thermal radiation scattering material is used, the dry-pressed compact, for example, may include preferably 50 to 93 mass % of the silica fine particles, 2 to 20 mass % of the reinforcement fiber, and 5 to 40 mass % of the thermal radiation scattering material, or may include more preferably 65 to 80 mass % of the silica fine particles, 5 to 18 mass % of the reinforcement fiber, and 15 to 30 mass % of the thermal radiation scattering material.

In the subsequent curing step S2, the dry-pressed compact prepared in the preparation step S1 is cured under the relative humidity of 70% or more. The relative humidity in the curing may be set, for example, to 75% or more, to 80% or more, or even to 85% or more. Further, the curing may also be carried out at a relative humidity of more than 85%.

The curing is carried out by keeping the dry-pressed compact for a predetermined time under such a high humidity environment as described above. To be specific, the dry-pressed compact can be subjected to high humidity curing, for example, by placing the dry-pressed compact in a thermo-hygrostat in which temperature and humidity are each set to a predetermined value, or in an autoclave in which arrival temperature is set to a predetermined value, and leaving the dry-pressed compact to stand for a predetermined time.

The temperature at which the curing is carried out may be arbitrarily set within a range in which the effect of the curing can be provided. To be specific, the curing temperature, for example, may be set to 40° C. or more, is set to preferably 60° C. or more, more preferably 80° C. or more, or particularly preferably 90° C. or more. By increasing the curing temperature, it is possible to reduce the curing time until the effect of the curing is provided. The upper limit of the curing temperature is not particularly limited and can be set to, for example, 95° C. or less. Note that when the dry-pressed compact includes an alkaline-earth metal hydroxide, the curing temperature may preferably be set to 100° C. or less, or less than 100° C. in some cases. Further, the curing temperature may be set to, for example, less than 40° C. as well.

Further, the curing may also be carried out under a pressurized condition. In this case, the curing temperature may be arbitrarily set within a range in which the effect of the curing can be provided. To be specific, the curing temperature under a pressurized condition, for example, may be set to 100 to 200° C. or may be even set to 120 to 170° C. By carrying out the curing under such a pressurized condition as described above, it is expected to reduce the curing time until the effect of the curing is provided.

The time for carrying out the curing may be arbitrarily set within a range in which the effect of the curing can be provided. To be specific, the curing time, for example, may be set to 2 hours or more, or is preferably set to 6 hours or more. Increasing the curing time can lead to the enhancement of the effect of the curing.

To be more specific, when the dry-pressed compact is free of both the alkaline-earth metal hydroxide and the alkali metal hydroxide, a longer curing time is preferred. Further, when the dry-pressed compact includes a relatively small amount (for example, 0.1 to 2 parts by weight with respect to 100 parts by weight of the raw material for a thermal insulation including the silica fine particles and the reinforcement fiber) of at least one of the alkaline-earth metal hydroxide and the alkali metal hydroxide, the curing time is preferably set to 6 hours or more and 100 hours or less. In the meantime, when the dry-pressed compact includes a relatively large amount (for example, more than 2 parts by weight and 20 parts by weight or less with respect to 100 parts by weight of the raw material for a thermal insulation including the silica fine particles and the reinforcement fiber) of at least one of the alkaline-earth metal hydroxide and the alkali metal hydroxide, the curing time is preferably set to 12 hours or less, or more preferably 6 hours or less.

Note that curing conditions are not limited to the above-mentioned examples, and may be arbitrarily set within a range in which the effect of the curing can be provided. That is, the curing conditions may be suitably adjusted, for example, so that the strength (for example, compressive strength) and thermal conductivity of the thermal insulation produced by the method of this embodiment fall within such predetermined ranges as described later. Further, the curing time is not limited to the above-mentioned examples, and may be suitably determined, for example, depending on other curing conditions such as temperature and humidity.

In the subsequent drying step S3, the dry-pressed compact cured in the curing step S2 is dried. That is, water is removed in the drying step S3, the water having penetrated into the dry-pressed compact at the time of the curing and being derived from water vapor. The drying method is not particularly limited as long as the drying method can remove unnecessary water from the dry-pressed compact. That is, for example, by keeping the dry-pressed compact at a temperature of 100° C. or more, the dry-pressed compact can be dried efficiently.

In the method of this embodiment, the dry-pressed compact having gone through the curing and the drying is thus finally obtained as a thermal insulation. According to the method of this embodiment, it is possible to produce a thermal insulation having both excellent thermal insulating performance and excellent strength. That is, according to the method of this embodiment, it is possible to effectively improve the strength of a thermal insulation without increasing the density of the thermal insulation. Further, according to the method of this embodiment, it is possible to produce a thermal insulation having sufficient strength without using a binder.

Figure 2A:
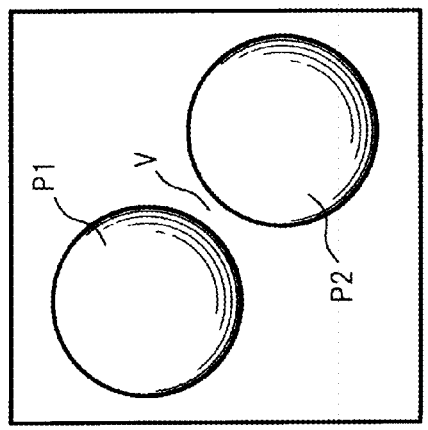
FIG. 2A is an explanatory diagram of a part of a mechanism by which the strength of a thermal insulation is improved by curing in the method of producing a thermal insulation according to one embodiment of the present invention.
Figure 2B:
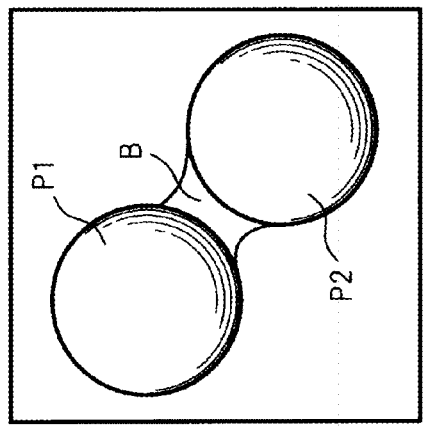
FIG. 2B is an explanatory diagram of another part of the mechanism by which the strength of the thermal insulation is improved by the curing in the method of producing a thermal insulation according to one embodiment of the present invention.
Figure 2C:
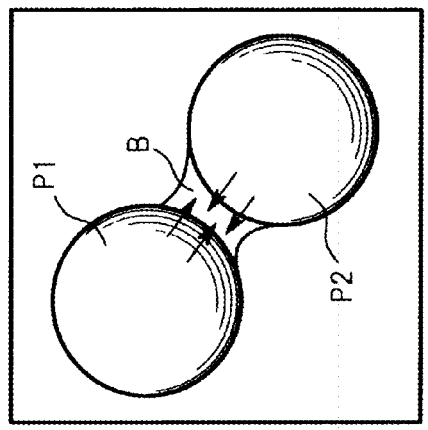
FIG. 2C is an explanatory diagram of still another part of the mechanism by which the strength of the thermal insulation is improved by the curing in the method of producing a thermal insulation according to one embodiment of the present invention.

FIGS. 2A to 2C are explanatory diagrams of a mechanism by which the strength of a thermal insulation is improved by high humidity curing in the method of this embodiment. Here, as illustrated in FIGS. 2A to 2C, attention is focused on two adjacent silica fine particles P1 and P2 out of the silica fine particles included in the dry-pressed compact, to thereby describe the mechanism. As the mechanism by which the strength of a thermal insulation is improved by high humidity curing, the following mechanism is considered.

That is, first, as illustrated in FIG. 2A, an extremely fine gap V (for example, an ultrafine pore having a size of about several nm) is present between the silica fine particles P1 and P2 included in the dry-pressed compact before curing. Next, curing in which the dry-pressed compact is kept under a high humidity atmosphere is started. Then, as illustrated in FIG. 2B, capillary condensation of water vapor forms a bridge structure B formed of a liquid containing condensed water as a main component between the silica fine particles P1 and P2.

Further, the dry-pressed compact is successively kept under the high humidity atmosphere. Then, as illustrated in FIG. 2C with arrows, silica is eluted from the silica fine particles P1 and P2, forming the bridge structure B containing the eluted silica between the silica fine particles P1 and P2. The elution reaction of silica must be the following silicate reaction: "$SiO_2 + 2H_2O \rightarrow H_4SiO_4 \rightarrow H^+ + H_3SiO_4^-$."

Next, the dry-pressed compact after the curing is dried. Then, the bridge structure B formed between the silica fine particles P1 and P2 is hardened. The formation of the bridge structure B described above can enhance the strength of the thermal insulation effectively. Note that a similar bridge structure is also formed between a silica fine particle and a reinforcement fiber.

Further, when the dry-pressed compact includes at least one of an alkaline-earth metal hydroxide and an alkali metal hydroxide, such improvement in the strength as described above can be promoted. As a result, curing time can be effectively reduced. This is probably because a highly basic environment suitable for the elution of silica from the silica fine particles P1 and P2 is formed in the inside of the dry-pressed compact owing to the presence of the alkaline-earth metal hydroxide or the alkali metal hydroxide.

That is, it is considered that the use of a strong base such as the alkaline-earth metal hydroxide or the alkali metal hydroxide promotes the elution of silica from the silica fine particles P1 and P2 in the curing, resulting in the achievement of improvement in the strength of the thermal insulation in a short time. Note that this case includes the formation of a bridge structure B, including at least one of an alkaline-earth metal and an alkali metal in addition to silica, between the silica fine particles P1 and P2.

A thermal insulation according to this embodiment (hereinafter referred to as "thermal insulation of this embodiment") can be preferably produced by the method of this embodiment described above. The thermal insulation of this embodiment can have sufficient strength while having relatively low density. That is, the thermal insulation of this embodiment can be, for example, a thermal insulation including silica fine particles each having an average particle diameter of 50 nm or less and a reinforcement fiber, having a bulk density of 190 to 600 kg/m$^3$, and having a compressive strength of 0.65 MPa or more.

The bulk density of the thermal insulation of this embodiment may be also set to, for example, 190 to 450 kg/m$^3$ or 190 to 300 kg/m$^3$. The compressive strength of the thermal insulation of this embodiment may be also set to, for example, 0.7 MPa or more or 0.75 MPa or more. Note that the compressive strength can be measured by using a predetermined compression testing apparatus such as a commercially available universal testing apparatus (TENSILON RTC-1150A, Orientec Co., Ltd.). To be specific, for example, a test piece obtained by cutting the thermal insulation of this embodiment so that the test piece has a dimension of 30 mm×30 mm×15 mm is loaded with a weight on the press surface (30 mm×30 mm) in the direction perpendicular to the press surface, and the weight of the load (MPa) at the time of fracture of the test piece is defined as the compressive strength. When the thermal insulation of this embodiment has a plate shape, the compressive strength can be evaluated as compressive strength in the thickness direction of the thermal insulation of this embodiment (that is, fracture strength at the time when a pair of surfaces extending in the longitudinal direction and having the largest area are compressed).

The thermal insulation of this embodiment, for example, may include 50 to 98 mass % of the silica fine particles and 2 to 20 mass % of the reinforcement fiber, or may include 65 to 80 mass % of the silica fine particles and 5 to 18 mass % of the reinforcement fiber. When the content of the reinforcement fiber is less than 2 mass %, the strength of the thermal insulation of this embodiment may be insufficient. When the content of the reinforcement fiber is more than 20 mass %, the powder flow property of the raw material for the thermal insulation of this embodiment at the time of forming may be impaired. As a result, reduction in the formability may occur and density irregularity may cause reduction in the workability.

Further, when the thermal insulation of this embodiment includes only the silica fine particles and the reinforcement fiber, the thermal insulation of this embodiment, for example, may include 80 to 98 mass % of the silica fine particles and 2 to 20 mass % of the reinforcement fiber so that the total content thereof reaches 100 mass %, may include preferably 82 to 98 mass % of the silica fine particles and 2 to 18 mass % of the reinforcement fiber so that the total content thereof reaches 100 mass %, or may include more preferably 85 to 97 mass % of the silica fine particles and 3 to 15 mass % of the reinforcement fiber so that the total content thereof reaches 100 mass %. When the content of the reinforcement fiber is less than 2 mass %, the strength of the thermal insulation of this embodiment may be insufficient. When the content of the reinforcement fiber is more than 20 mass %, the powder flow property of the raw material for the thermal insulation of this embodiment at the time of forming may be impaired. As a result, reduction in the formability may occur and density irregularity may cause reduction in the workability.

Further, the thermal insulation of this embodiment may be free of a binder. That is, the thermal insulation of this embodiment can obtain sufficient strength by curing as described above, and hence it is not necessary to use a binder. In this case, the thermal insulation of this embodiment is substantially free of a binder that has been conventionally used, such as an inorganic binder, for example, a water glass adhesive or an organic binder, for example, a resin. Thus, conventional problems involved in the use of binders can be reliably avoided.

Further, the thermal insulation of this embodiment may include at least one of an alkaline-earth metal and an alkali metal in addition to the silica fine particles and the reinforcement fiber. That is, the thermal insulation of this embodiment may include a metal derived from at least one of the alkaline-earth metal hydroxide and the alkali metal hydroxide used in the curing.

To be specific, the thermal insulation of this embodiment may include at least one kind of alkaline-earth metal selected from the group consisting of, for example, calcium, magnesium, strontium, and barium. In particular, the thermal insulation of this embodiment preferably includes calcium. Further, the thermal insulation of this embodiment may include at least one kind of alkali metal selected from the group consisting of, for example, sodium, potassium, and lithium.

The thermal insulation of this embodiment may include, for example, at least one of the alkaline-earth metal and the alkali metal, each at 0.1 to 10 parts by weight with respect to 100 parts by weight of a raw material for the thermal insulation of this embodiment including the silica fine particles and the reinforcement fiber. That is, in this case, the thermal insulation of this embodiment, for example, may include one of the alkaline-earth metal and the alkali metal at 0.1 to 10 parts by weight, or may include the alkaline-earth metal and the alkali metal at 0.2 to 20 parts by weight in total. Further, the content of at least one of the alkaline-earth metal and the alkali metal may be set, for example, to 1 to 7 parts by weight or even to 2 to 5 parts by weight.

The thermal insulation of this embodiment may further include other components. That is, the thermal insulation of this embodiment may also include, for example, a thermal radiation scattering material. The thermal radiation scattering material is not particularly limited as long as the thermal radiation scattering material can reduce heat transfer caused by thermal radiation. Any one kind of thermal radiation scattering material may be used alone, or two or more kinds of thermal radiation scattering materials may be used in optional combination.

To be specific, it is possible to use at least one kind of thermal radiation scattering material selected from the group consisting of silicon carbide, zirconia, and titania. Further, the thermal radiation scattering material preferably has an average particle diameter of, for example, 50 μm or less, or to be more specific, 1 to 50 μm, and has a specific refractive index of, for example, 1.25 or more with respect to the light having a wavelength of 1 μm or more.

When the thermal radiation scattering material is used, the thermal insulation of this embodiment, for example, may include 50 to 93 mass % of the silica fine particles, 2 to 20 mass % of the reinforcement fiber, and 5 to 40 mass % of the thermal radiation scattering material, or may more preferably include 65 to 80 mass % of the silica fine particles, 5 to 18 mass % of the reinforcement fiber, and 15 to 30 mass % of the thermal radiation scattering material.

Further, the thermal insulation of this embodiment can have excellent thermal insulating performance. That is, the thermal insulation of this embodiment has obtained sufficient strength without increasing its density, unlike conventional thermal insulations, and hence reduction in thermal insulating performance due to the increase of solid heat transfer can be effectively avoided. To be specific, the thermal insulation of this embodiment can be a thermal insulation having a thermal conductivity at 600° C. of 0.05 W/(m·K) or less. The thermal conductivity at 600° C. of the thermal insulation of this embodiment can also be preferably set to 0.04 W/(m·K) or less.

Note that the thermal insulation of this embodiment has a structure in which each primary particles of the silica fine particles having an average particle diameter of 50 nm or less is assembled by an intermolecular force or the like to form secondary particles, which are dispersed among pieces of the reinforcement fiber. Further, because silica fine particles are used in the thermal insulation of this embodiment, the thermal insulation of this embodiment internally has a structure of nanopores smaller than the mean free path of an air molecule, and hence the thermal insulation of this embodiment can exert excellent thermal insulating performance in a wide temperature range of from a low temperature region to a high temperature region.

Further, the thermal insulation of this embodiment may be a thermal insulation having a peculiar structure formed through high humidity curing. That is, the thermal insulation of this embodiment can be, for example, a thermal insulation including silica fine particles each having an average particle diameter of 50 nm or less and a reinforcement fiber, and having a bridge structure containing silica between the silica fine particles. The bridge structure is, as described above, formed by capillary condensation of water vapor and contains silica eluted from the silica fine particles.

Further, the bridge structure may also include at least one of an alkaline-earth metal and an alkali metal. That is, the bridge structure in this case includes, as described above, at least one of the alkaline-earth metal and the alkali metal derived from at least one of the alkaline-earth metal hydroxide and the alkali metal hydroxide used in the curing.

Further, the thermal insulation of this embodiment may include calcium silicate. That is, for example, when the thermal insulation of this embodiment is produced through high humidity curing in which calcium hydroxide is added, calcium silicate may be generated inside the thermal insulation of this embodiment because of a chemical reaction between a silica component eluted from the silica fine particles and the calcium hydroxide. Thus, the thermal insulation of this embodiment may include calcium silicate generated through the high humidity curing in the bridge structure formed between silica fine particles or in another part.

As described above, the thermal insulation of this embodiment can have both excellent thermal insulating performance and high strength while having relatively low density. Thus, the thermal insulation of this embodiment can be preferably utilized as, for example, a thermal insulation being used for a general industrial furnace and requiring processing or a thermal insulation for a reformer of a fuel cell.

Next, specific examples according to this embodiment are described.

Example 1

[Production of Thermal Insulation]

There was produced a dry-pressed compact including anhydrous silica fine particles (hydrophilic fumed silica fine particles) having an average primary particle diameter of about 13 nm and having a thermal conductivity (25° C.) of 0.01 W/(m·K), and a heat-resistant glass fiber having an average fiber diameter of 10 μm and having an average fiber length of 3 mm.

That is, 100 parts by weight of a raw material for a thermal insulation including 90 mass % of silica fine particles and 10 mass % of a glass fiber and 0, 1, 3, 5, or 10 parts by weight of calcium hydroxide (Extra Pure Reagent, Wako Pure Chemical Industries, Ltd.) were fed into a mixing apparatus, and the mixture was subjected to dry mixing.

Then, the resultant dry-mixed powder was used to produce a dry-pressed compact having a plate shape of 100 mm×150 mm and 15 mm in thickness by dry-press forming. To be specific, a suitable amount of the dry-mixed powder was first filled in a forming mold having a predetermined deaeration system. Then, dry-press forming was carried out so as to provide a desired bulk density. That is, in the dry-press forming, a pressing pressure was adjusted so as to provide the dry-pressed compact with a bulk density of 250 kg/m$^3$. After the forming, the resultant dry-pressed compact was immediately taken out of the forming mold.

Next, the dry-pressed compact was kept for 3 to 400 hours in a thermo-hygrostat at a temperature of 80° C. and at a relative humidity of 90%, or kept for 6 hours in an autoclave at a temperature of 170° C., to thereby carry out high humidity curing. Then, the dry-pressed compact after the curing was dried at 105° C. to yield a thermal insulation.

[Evaluation of Compressive Strength]

The compressive strengths of each the thermal insulation were measured by using a universal testing apparatus (TENSILON RTC-1150A, Orientec Co., Ltd.). That is, a test piece obtained by cutting the thermal insulation so that the test piece had a dimension of 30 mm×30 mm×15 mm was loaded with a weight on the press surface (30 mm×30 mm) in the direction perpendicular to the press surface, and the weight of the load at the time of fracture of the test piece was defined as the compressive strength (MPa).

FIG. 3 shows the production condition and compressive strength of each thermal insulation by relating them to each other. The compressive strength of the thermal insulations having undergone curing increased remarkably compared with the compressive strength (0.25 MPa) of the thermal insulations not having undergone curing.

That is, when curing was carried out at 80° C. at 90 RH % with no calcium hydroxide added (0 parts by weight), the compressive strength was improved as the curing time increased. To be specific, 3 hours of curing increased the compressive strength up to 0.40 MPa and 400 hours of curing resulted in a compressive strength of 1.08 MPa.

In the meantime, when curing was carried out in an autoclave with no calcium hydroxide added (0 parts by weight, A/C), the compressive strength of the thermal insulation having undergone 6 hours of curing was 0.97 MPa. Note that, though not shown in FIG. 3, when curing was carried out in an autoclave at 120° C. or 200° C. with no calcium hydroxide added, it was also confirmed that 6 hours of curing increased the compressive strength to a similar extent.

In the meantime, it was possible to enhance the compressive strength in a shorter time in the case where curing was carried out with calcium hydroxide added compared with the case where curing was carried out with no calcium hydroxide added. Further, it was confirmed that there was a tendency that as the addition amount of calcium hydroxide was increased, it was possible to enhance the compressive strength in a shorter time.

That is, when curing was carried out at 80° C. at 90 RH % with 1 part by weight of calcium hydroxide added, 3 hours of curing increased the compressive strength up to 0.83 MPa and 48 hours of curing resulted in a compressive strength of 1.13 MPa.

When curing was carried out at 80° C. at 90 RH % with 3 parts by weight of calcium hydroxide added, 3 hours of curing increased the compressive strength up to 0.89 MPa and 6 hours of curing resulted in a compressive strength of 1.03 MPa.

When curing was carried out at 80° C. at 90 RH % with 5 parts by weight of calcium hydroxide added, 3 hours of curing increased the compressive strength up to 0.91 MPa and 6 hours of curing resulted in a compressive strength of 1.08 MPa.

When curing was carried out at 80° C. at 90 RH % with 10 parts by weight of calcium hydroxide added, 3 hours of curing increased the compressive strength up to 0.93 MPa.

On the other hand, in the case where curing was carried out in an autoclave with calcium hydroxide added (1 to 10 parts by weight, A/C), the compressive strength increased to a lower extent compared with the case where curing was carried out at 80° C. at 90 RH %.

[Electron Microscope Observation]

FIG. 4 shows one example of each of the results obtained by observing, with a scanning electron microscope (SEM), a thermal insulation produced without adding any calcium hydroxide and without curing (FIGS. 4(A) and 4(B)), and a thermal insulation produced by adding 3 parts by weight of calcium hydroxide and carrying out curing at 80° C. at 90 RH % for 24 hours (FIGS. 4(C) and 4(D)).

As shown in FIG. 4(A), unevenness was clearly observed on the surface of the thermal insulation produced without adding any calcium hydroxide and without curing. In contrast, as shown in FIG. 4(C), the surface of the thermal insulation produced by adding calcium hydroxide and carrying out curing was relatively flat. This must be because, in the thermal insulation shown in FIG. 4(A), individual silica fine particles simply aggregated, and in contrast, in the thermal insulation shown in FIG. 4(C), silica components eluted from silica fine particles formed a bridge structure between the silica fine particles, resulting in the densification of the internal structure of the thermal insulation.

Further, as shown in FIG. 4(B), on the surface of the thermal insulation produced without adding any calcium hydroxide and without curing, a blurred boundary was observed between silica fine particles. In contrast, as shown in FIG. 4(D), on the surface of the thermal insulation produced by adding calcium hydroxide and carrying out curing, the boundary between silica fine particles was clearly observed. This was probably because, in the thermal insulation shown in FIG. 4(D), silica components eluted from silica fine particles formed a bridge structure between the silica fine particles, resulting in enhancement of electrical conductivity, and hence electron beams were able to be detected with high sensitivity.

[X-Ray Diffraction]

Each of thermal insulations produced by adding 3, 5, or 10 parts by weight of calcium hydroxide and carrying out curing at 80° C. at 90 RH % for 0 to 24 hours or carrying out curing for 6 hours in an autoclave was subjected to X-ray diffraction (XRD), analyzing how the content of calcium hydroxide and the formation amount of calcium silicate changed depending on the increase of curing time.

Figure 5B:
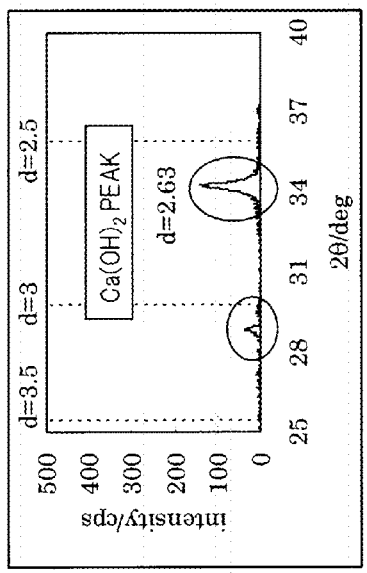
FIG. 5B is an explanatory diagram illustrating another example of the X-ray diffraction results of the thermal insulation obtained in the example according to one embodiment of the present invention.
Figure 5D:
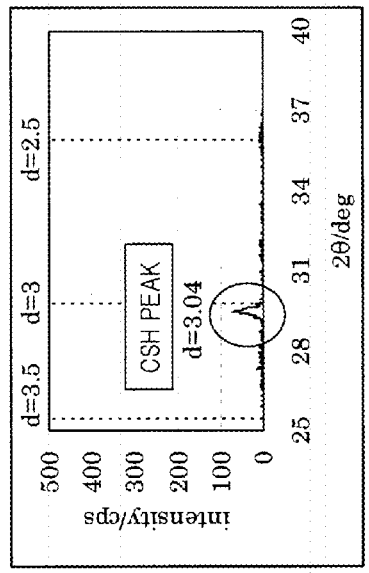
FIG. 5D is an explanatory diagram illustrating still another example of the X-ray diffraction results of the thermal insulation obtained in the example according to one embodiment of the present invention.
Figure 5A:
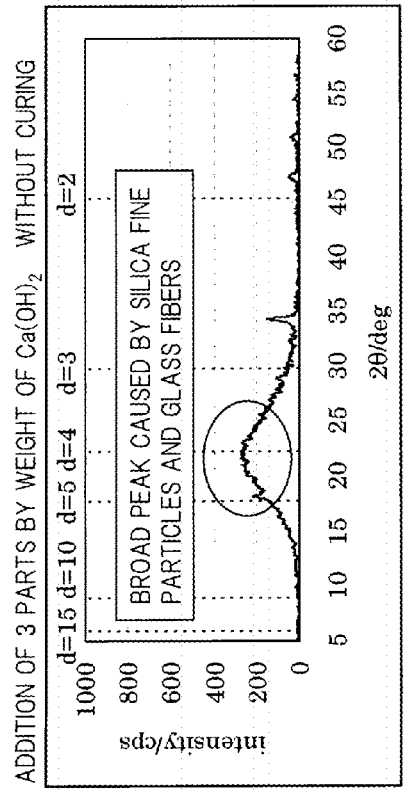
FIG. 5A is an explanatory diagram illustrating one example of X-ray diffraction results of a thermal insulation obtained in the example according to one embodiment of the present invention.
Figure 5C:
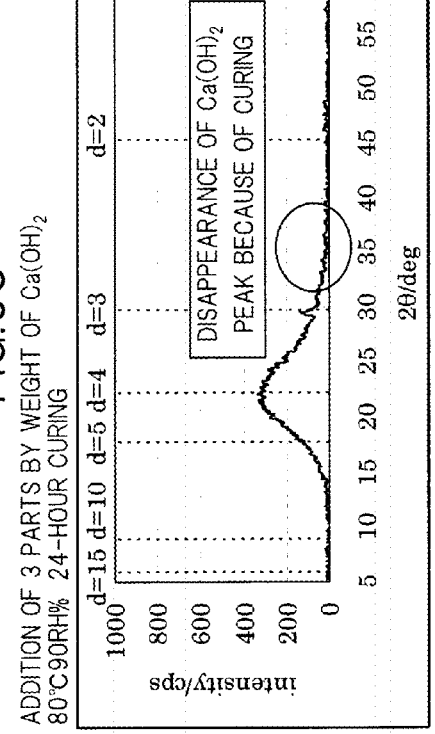
FIG. 5C is an explanatory diagram illustrating still another example of the X-ray diffraction results of the thermal insulation obtained in the example according to one embodiment of the present invention.

FIGS. 5A to 5D show examples of the XRD measurement results of thermal insulations produced by adding 3 parts by weight of calcium hydroxide. FIGS. 5A and 5B illustrate the measurement results of a thermal insulation produced without curing, and FIGS. 5C and 5D illustrate the measurement results of a thermal insulation produced by carrying out curing for 24 hours. As illustrated in FIGS. 5A to 5D, peaks of calcium hydroxide (Ca (OH)$_2$) disappeared and a peak of calcium silicate (CSH) newly appeared because of the curing.

Figure 6B:
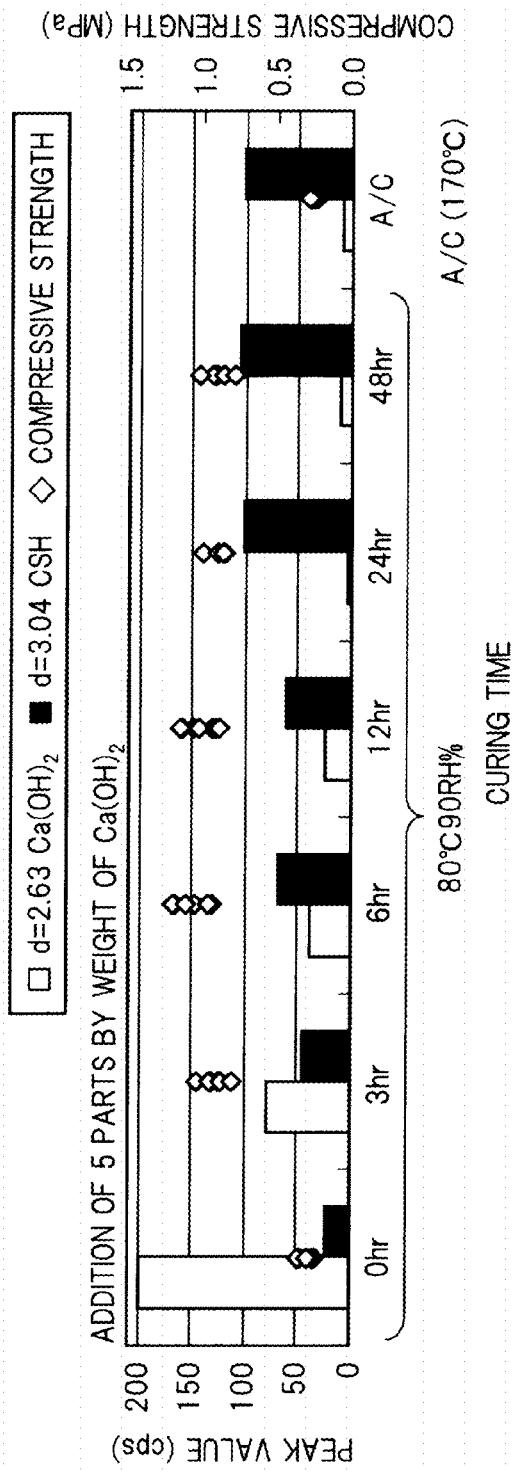
FIG. 6B is an explanatory diagram illustrating another example of a correlation of peak values in an X-ray diffraction and a compressive strength with respect to a thermal insulation obtained in the example according to one embodiment of the present invention.
Figure 6C:
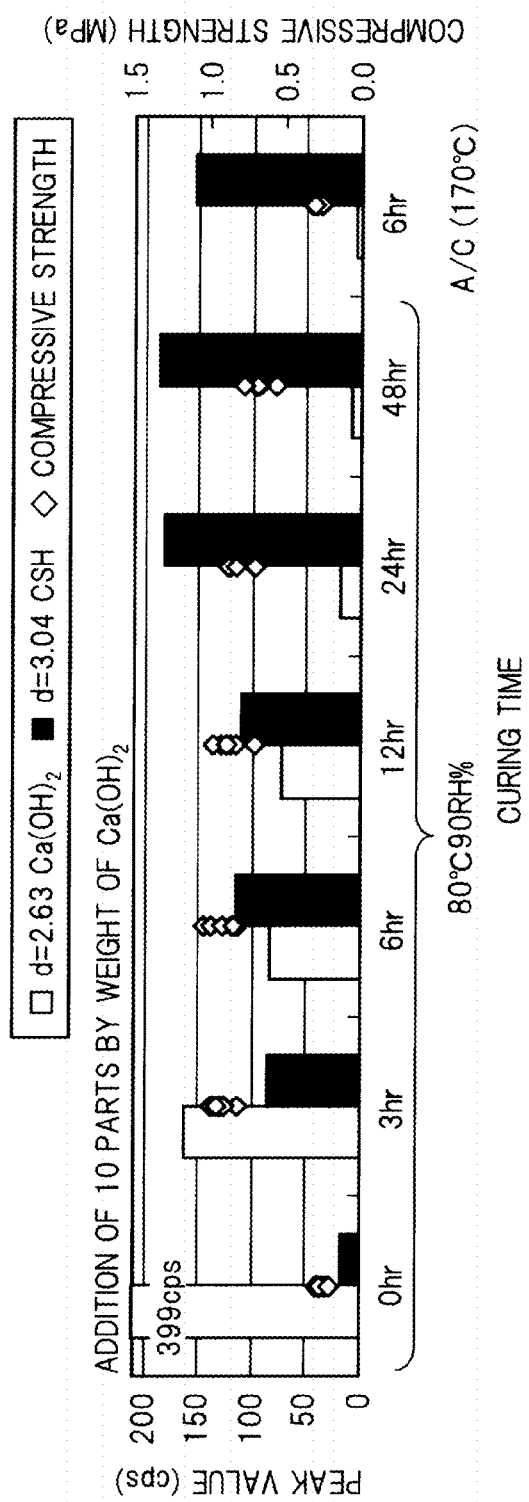
FIG. 6C is an explanatory diagram illustrating still another example of a correlation of peak values in an X-ray diffraction and a compressive strength with respect to a thermal insulation obtained in the example according to one embodiment of the present invention.

FIGS. 6A to 6C show the curing time, XRD peak values of calcium hydroxide ($Ca(OH)_2$) and calcium silicate (CSH), and compressive strength of each thermal insulation by relating them to each other. FIG. 6A shows the results on thermal insulations produced by adding 3 parts by weight of calcium hydroxide. FIG. 6B shows the results on thermal insulations produced by adding 5 parts by weight of calcium hydroxide. FIG. 6C shows the results on thermal insulations produced by adding 10 parts by weight of calcium hydroxide.

As shown in FIGS. 6A to 6C, it was found that there was a tendency for the content of calcium hydroxide to decrease with increasing curing time, resulting in the increase of the compressive strength. That is, it was found that there was a tendency that as the consumption amount of calcium hydroxide increased, the compressive strength of a thermal insulation increased.

Further, with increasing curing time, new generation of calcium silicate occurred, leading to the increase of the content of calcium silicate. It should be noted that after complete consumption of calcium hydroxide, it was found that there was a tendency for the compressive strength to decrease though the content of calcium silicate increased.

That is, there was not always a correlation between the content of calcium silicate and the increase of the compressive strength of a thermal insulation. Rather, it was found that there was a tendency for the compressive strength to decrease as the content of calcium silicate increased.

Example 2

[Production of Thermal Insulation]

There was produced a dry-pressed compact further including silicon carbide having an average particle diameter of 3 μm in addition to the silica fine particles and the glass fiber used in Example 1 described above.

That is, 100 parts by weight of a raw material for a thermal insulation including 75 mass % of silica fine particles, 5 mass % of a glass fiber, and 20 mass % of silicon carbide and 0, 3, 5, or 10 parts by weight of calcium hydroxide were fed into a mixing apparatus, and the mixture was subjected to dry mixing.

The resultant dry-mixed powder was used to produce a dry compact having a plate shape of 100 mm×150 mm and 15 mm in thickness by dry-press forming. In the dry-press forming, a pressing pressure was adjusted so as to provide the dry-pressed compact with a bulk density of 240, 260, 280 or 300 kg/m³.

Next, the dry-pressed compact including calcium hydroxide was kept for 8 hours in a thermo-hygrostat at a temperature of 80° C. and at a relative humidity of 90%, to thereby carry out high humidity curing. Then, the dry-pressed compact after the curing was dried at 105° C. to yield a thermal insulation. In the meantime, a dry-pressed compact free of calcium hydroxide was not subjected to curing.

[Evaluation of Compressive Strength and Thermal Conductivity]

The compressive strengths of each the thermal insulation were measured in the same manner as that in Example 1 described above. Further, the thermal conductivities of each the thermal insulation at 200, 400, or 600° C. was measured by a cyclic heat method. That is, a temperature wave was propagated in a test body, and the phase lag of the temperature wave was used to determine thermal diffusivity. Then, the thermal diffusivity and specific heat and density both separately measured were used to calculate the thermal conductivity. Note that the temperature wave which was used was a wave of temperature having a temperature amplitude of about 4° C. and having a period of about 1 hour. Further, a time required for the temperature wave to pass through from one point to another in the test body was defined as the phase lag. As is well known, the cyclic heat method provides two kinds of ways for thermal diffusivity measurement; one is a way to measure the phase lag of the generated temperature wave which propagates through a specimen, the other is a way to measure the amplitude decay of the temperature wave. Anyhow the physical value obtained from these two ways is the thermal diffusivity of a specimen, so the thermal conductivity of the specimen is obtained by multiplying the specific heat and the bulk density by the thermal diffusivity.

FIG. 7 shows the addition amount of calcium hydroxide, bulk density, compressive strength, and thermal conductivity by relating them to each other. Note that the bulk density was calculated from the weight and volume of a test body. That is, the actual dimension of the test body was used to calculate the volume of the test body, and a value obtained by dividing the weight of the test body by the volume was defined as the bulk density of the test body.

As shown in FIG. 7, it was demonstrated that curing with calcium hydroxide added increased the compressive strength of a thermal insulation. Further, when the bulk density was set to a given value, the compressive strength was highest in the case where the addition amount of calcium hydroxide was 3 parts by weight. Further, a significant change in the thermal conductivity depending on whether or not curing was carried out was not found.

Example 3

[Production of Thermal Insulation]

There was produced a dry-pressed compact including silica fine particles, a glass fiber, and silicon carbide in the same manner as that in Example 2 described above. That is, 100 parts by weight of a raw material for a thermal insulation including 75 mass % of silica fine particles, 5 mass % of a glass fiber, and 20 mass % of silicon carbide and 0 or 3 parts by weight of calcium hydroxide were fed into a mixing apparatus, and the mixture was subjected to dry mixing.

The resultant dry-mixed powder was used to produce a dry-pressed compact having a plate shape of 100 mm×150 mm and 15 mm in thickness by dry-press forming. In the dry-press forming, a pressing pressure was adjusted so as to provide the dry-pressed compact with a bulk density of 240, 260, 280 or 300 kg/m³.

Next, the dry-pressed compact including calcium hydroxide was kept for 0 to 24 hours in a thermo-hygrostat at a temperature of 80° C. and at a relative humidity of 90%, to thereby carry out high humidity curing. Then, the dry-pressed compact after the curing was dried at 105° C. to yield a thermal insulation. In the meantime, a dry-pressed compact free of calcium hydroxide was not subjected to curing.

[Evaluation of Compressive Strength]

The compressive strength of each thermal insulation was measured in the same manner as that in Example 1 described above. FIG. 8 shows the addition amount of calcium hydroxide, curing time, bulk density, and compressive strength by relating them to each other.

As shown in FIG. 8, the compressive strength of thermal insulations produced by carrying out curing (3 parts by weight of calcium hydroxide were added and the curing time was 1 to 24 hours) remarkably increased compared with that in the case where curing was not carried out (calcium hydroxide was not added or 3 parts by weight of calcium hydroxide were added, and the curing time was 0 hours).

Further, when 3 parts by weight of calcium hydroxide were added, it was found that there was a tendency for the compressive strength to increase with increasing curing time. Note that in the case where 3 parts by weight of calcium hydroxide were added and no curing was carried out, the compressive strength decreased more than that in the case where no calcium hydroxide was added and no curing was carried out.

Example 4

[Production of Thermal Insulation]

There was produced a dry-pressed compact including silica fine particles, a glass fiber, and silicon carbide in the same manner as that in Example 2 described above. That is, 100 parts by weight of a raw material for a thermal insulation including 75 mass % of silica fine particles, 5 mass % of a glass fiber, and 20 mass % of silicon carbide and 3 parts by weight of calcium hydroxide were fed into a mixing apparatus, and the mixture was subjected to dry mixing.

The resultant dry-mixed powder was used to produce a dry-pressed compact having a plate shape of 100 mm×150 mm and 15 mm in thickness by dry-press forming. In the dry-press forming, a pressing pressure was adjusted so as to provide the dry-pressed compact with a bulk density of 240, 260, or 280 kg/m$^3$.

Next, the dry-pressed compact was kept for 24 hours in a thermo-hygrostat at a temperature of 40, 60, or 80° C. and at a relative humidity of 90%, to thereby carry out high humidity curing. Then, the dry-pressed compact after the curing was dried at 105° C. to yield a thermal insulation. In the meantime, a thermal insulation produced without adding any calcium hydroxide and without curing was prepared as well.

[Evaluation of Compressive Strength]

The compressive strength of each thermal insulation was measured in the same manner as that in Example 1 described above. FIG. 9 illustrates curing temperature, bulk density, and compressive strength by relating them to each other. As illustrated in FIG. 9, curing at a temperature of 40° C. or more remarkably increased the compressive strength. Further, as the curing time was higher, the compressive strength remarkably increased.

[Electron Microscope Observation]

Figure 10B:
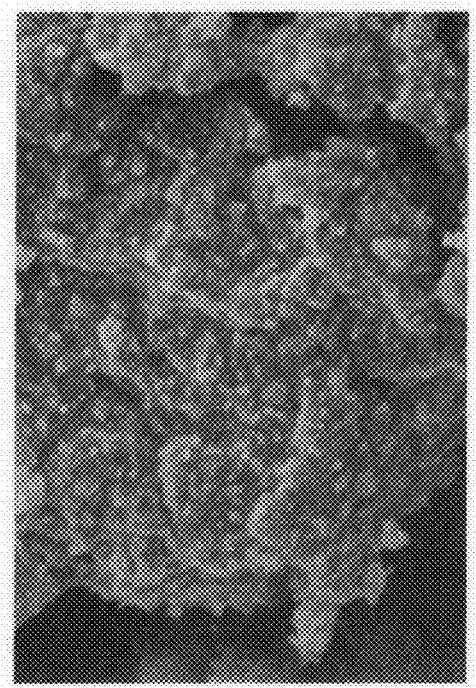
FIG. 10B is an explanatory diagram showing still another example of an electron microscope photograph of a thermal insulation obtained in the example according to one embodiment of the present invention.
Figure 10A:
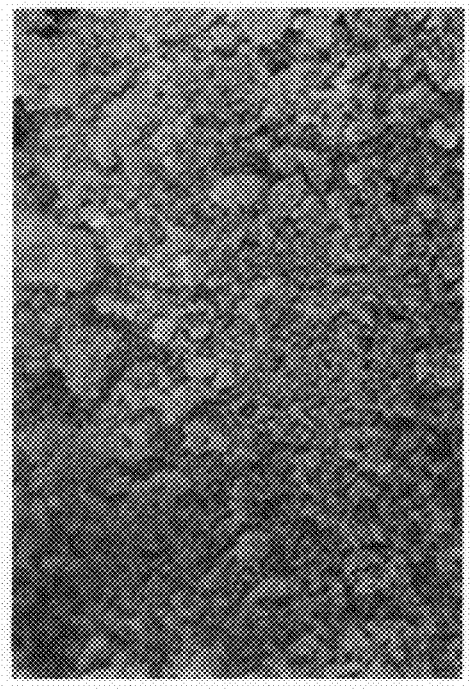
FIG. 10A is an explanatory diagram showing another example of an electron microscope photograph of a thermal insulation obtained in the example according to one embodiment of the present invention.

FIGS. 10A and 10B show examples of each of the results obtained by observing, with a scanning electron microscope, a thermal insulation produced by carrying out curing without adding any calcium hydroxide (FIG. 10A), and a thermal insulation produced by adding 3 parts by weight of calcium hydroxide and carrying out curing at 40° C. at 90 RH % for 24 hours (FIG. 10B).

As shown in FIGS. 10A and 10B, the surface of the thermal insulation produced by adding calcium hydroxide and carrying out curing (FIG. 10B) was more smooth compared with that of the thermal insulation produced by carrying out curing without adding any calcium hydroxide (FIG. 10A). This must be because, in the thermal insulation shown in FIG. 10B, the addition of calcium hydroxide promoted the elution of silica components from silica fine particles, resulting in increased densification of the internal structure.

Example 5

[Production of Thermal Insulation]

There was produced a dry-pressed compact including silica fine particles, a glass fiber, and silicon carbide in the same manner as that in Example 2 described above. That is, 100 parts by weight of a raw material for a thermal insulation including 75 mass % of silica fine particles, 5 mass % of a glass fiber, and 20 mass % of silicon carbide and 0 or 3 parts by weight of calcium hydroxide or magnesium hydroxide were fed into a mixing apparatus, and the mixture was subjected to dry mixing.

The resultant dry-mixed powder was used to produce a dry-pressed compact having a plate shape of 100 mm×150 mm and 15 mm in thickness by dry-press forming. In the dry-press forming, a pressing pressure was adjusted so as to provide the dry-pressed compact with a bulk density of 240, 260 or 280 kg/m$^3$.

Next, the dry-pressed compact was kept for 24 hours in a thermo-hygrostat at a temperature of 80° C. and at a relative humidity of 90%, to thereby carry out high humidity curing. Then, the dry-pressed compact after the curing was dried at 105° C. to yield a thermal insulation. In the meantime, a thermal insulation produced without adding any calcium hydroxide and without curing was prepared as well.

[Evaluation of Compressive Strength]

The compressive strength of each thermal insulation was measured in the same manner as that in Example 1 described above. FIG. 11 illustrates the kind of hydroxide added, bulk density, and compressive strength by relating them to each other.

As shown in FIG. 11, curing with no hydroxide added remarkably increased the compressive strength, and curing with calcium hydroxide added increased the compressive strength more remarkably. Further, curing with magnesium hydroxide added also increased the compressive strength compared with the case where no hydroxide was added and curing was not carried out.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A method of producing a thermal insulation, comprising:
    dry mixing a raw material for a thermal insulation and at least one of an alkaline-earth metal hydroxide and an alkali metal hydroxide, the raw material comprising silica fine particles each having an average particle diameter of 50 nm or less and reinforcement fibers;
    subjecting the dry mixture to dry-press forming to obtain a dry-pressed compact, the dry-pressed compact being one formed body wherein the silica fine particles, the reinforcement fibers and the at least one of an alkaline-earth metal hydroxide and an alkali metal hydroxide being mixed, the at least one of an alkaline-earth metal hydroxide and an alkali metal hydroxide being 0.1 to 10 parts by weight with respect to 100 parts by weight of the raw material; and
    curing the dry-pressed compact at a relative humidity of 70% or more.

2. The method of producing a thermal insulation according to claim 1, wherein the dry-pressed compact comprises 50 to 98 mass % of the silica fine particles and 2 to 20 mass % of the reinforcement fiber.

3. The method of producing a thermal insulation according to claim 1, wherein the thermal insulation has a bulk density of 190 to 600 kg/m$^3$ and has a compressive strength of 0.65 MPa or more.

4. The method of producing a thermal insulation according to claim 1, wherein the thermal insulation has a thermal conductivity at 600° C. of 0.05 W/(m·K) or less.

5. The method of producing a thermal insulation according to claim 1, wherein the dry-pressed compact comprises $Ca(OH)_2$.

6. The method of producing a thermal insulation according to claim 5, wherein the dry-pressed compact comprises the $Ca(OH)_2$ at 0.1 to 10 parts by weight with respect to 100 parts by weight of a raw material for the thermal insulation comprising the silica fine particles, and the reinforcement fiber.

7. The method of producing a thermal insulation according to claim 1, wherein the dry-pressed compact is cured at a temperature of 40° C. to 95° C. and a duration of 2 hours or more.

8. The method of producing a thermal insulation according to claim 5, wherein the dry-pressed compact comprises the $Ca(OH)_2$ at 1 to 10 parts by weight with respect to 100 parts by weight of a raw material for the thermal insulation comprising the silica fine particles, and the reinforcement fiber.

9. The method of producing a thermal insulation according to claim 1, wherein the curing is conducted in an autoclave.

10. The method of producing a thermal insulation according to claim 1, wherein the dry-pressed compact is cured at 40° C. to 200° C. for 2 hours or more under a pressurized condition.

11. The method of producing a thermal insulation according to claim 1, wherein the method further comprises drying the cured dry-pressed compact.

12. The method of producing a thermal insulation according to claim 1, wherein the dry-pressed compact further comprises a thermal radiation scattering material.

13. The method of producing a thermal insulation according to claim 12, wherein the thermal radiation scattering material is at least one selected from the group consisting of silicon carbide, zirconia and titania.

14. The method of producing a thermal insulation according to claim 12, wherein the dry-pressed compact comprises 50 to 93 mass % of the silica fine particles, 2 to 20 mass % of the reinforcement fiber, and 5 to 40 mass % of the thermal radiation scattering material.

15. The method of producing a thermal insulation according to claim 1, wherein the dry-pressed compact comprises 1 to 7 parts by weight of the at least one of an alkaline-earth metal hydroxide and an alkali metal hydroxide with respect to 100 parts by weight of the raw material.

16. The method of producing a thermal insulation according to claim 1, wherein the dry-pressed compact comprises 2 to 5 parts by weight of the at least one of an alkaline-earth metal hydroxide and an alkali metal hydroxide with respect to 100 parts by weight of the raw material.

17. The method of producing a thermal insulation according to claim 1, wherein when the dry-pressed compact comprises 0.1 to 2 parts by weight of the at least one of an alkaline-earth metal hydroxide and an alkali metal hydroxide with respect to 100 parts by weight of the raw material, a curing time is 6 hours or more; and when the dry-pressed compact comprises more than 2 parts by weight and 10 parts by weight or less of the at least one of an alkaline-earth metal hydroxide and an alkali metal hydroxide with respect to 100 parts by weight of the raw material, a curing time is 6 hours or less.

* * * * *